May 15, 1934.  G. C. FOSTER  1,958,850
TENNIS COURT
Filed July 28, 1932
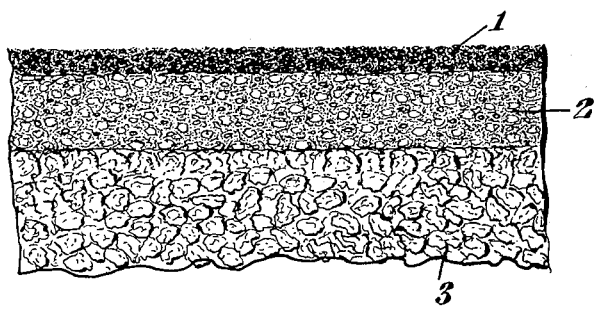
INVENTOR
Guy C. Foster
BY
Ward Crosby & Neal
ATTORNEYS

UNITED STATES PATENT OFFICE 1,958,850

TENNIS COURT

Guy C. Foster, Tenafly, N. J., assignor to En-Tout-Cas Company (Syston) Limited, Syston, England, a corporation of Great Britain Application July 28, 1932, Serial No. 625,252

4 Claims. (Cl. 94—7)

Tennis courts have been constructed for a number of years with the aid of imported materials wherein a satisfactory playing surface was afforded, in conjunction with quick drainage or rapid drying qualities which are markedly superior as compared to clay or grass courts of the types in common use.

I have discovered that a highly satisfactory tennis court may be obtained by the use of epidote, a material which is available in quantity in this country, and which I have found by use under actual playing conditions to afford a playing surface of a granular character, having proper resilence or "bounce", which does not loosen, rough up or shift unduly during play, and which possesses the rapid drainage qualities above referred to.

The single figure of the drawing is a sectional view of a court constructed in accordance with the invention.

I prefer to employ graded sizes of epidote, in such manner as to provide a top layer 1 in which the finer sizes predominate, and a subjacent layer 2 in which coarser sizes predominate. For example, the layer 1 may contain by weight, proportions of the order of 6% ground epidote which will pass through a screen of 6 meshes to the inch, but be retained on a 14 mesh screen, 62% passing through a 34 mesh screen but retained on a 60 mesh screen, 16% passing through a 60 mesh screen, and 16% of mill run dust.

The layer 2 may contain by weight, proportions of the order of 50% of ground epidote, passing through a 6 mesh screen but retained on a 14 mesh screen, 30% passing through a 34 mesh screen but retained on a 60 mesh screen, 12% passing through a 60 mesh screen, and 8% of mill run dust.

The epidote referred to in the above formula is of the ordinary or lime type, but piedmontite or allanite could be incorporated therein with satisfactory results; the manganese type of epidote however is not equally satisfactory because of its difference in color.

In constructing the court, a bottom layer 3 of cinders or similar porous material is preferably used, as already known, the court being rolled and otherwise conditioned in the usual manner, employing a suitable binder and/or hygroscopic agent if desired although the latter is not a necessity. The top layer 1 may be, for example, about ⅛ inch thick and the subjacent layer 2 about ½ inch thick.

I claim:

1. A tennis court of the character described, having a relatively thin top layer comprised largely of epidote in which small sized granules predominate, and a thicker subjacent layer comprised largely of epidote in which larger sized granules predominate.

2. A tennis court of the character described, having a relatively thin top layer comprised largely of epidote in which small sized granules perdominate, and a thicker subjacent layer comprised largely of epidote in which larger sized granules predominate, each of said layers comprising a graded mixture of granules of various sizes.

3. A tennis court of the character described, having a relatively thin top layer comprised largely of a mixture of epidote granules graded as to size in proportions of the order of 6% granules of 6–14 mesh size, 60% 34–60 mesh size, 16% granules of smaller than 60 mesh size and 16% mill run dust, and a thicker subjacent layer comprised largely of a mixture of epidote granules graded as to size in proportions of the order of 50% granules of 6–14 mesh size, 30% of 34–60 mesh size, 12% of smaller than 60 mesh size and 8% of mill run dust.

4. A tennis court of the character described, having a top layer comprised largely of ground epidote.

GUY C. FOSTER.